United States Patent [19]

Orlans

[11] Patent Number: 4,690,761
[45] Date of Patent: Sep. 1, 1987

[54] ANNULAR FILTER DISC

[75] Inventor: Itzhak Orlans, M.P. Hevel Korazim, Israel

[73] Assignee: Amida Sinun Vehashkaya, M.P. Hevel Korazim, Israel

[21] Appl. No.: 828,556

[22] Filed: Feb. 10, 1986

[30] Foreign Application Priority Data

May 7, 1985 [IL] Israel ......................................... 75110

[51] Int. Cl.⁴ ............................................ B01D 29/46
[52] U.S. Cl. .............................. 210/330; 210/333.01; 210/488

[58] Field of Search ............... 210/488, 324, 329, 330, 210/331, 332, 333.01, 411, 345, 318, 314, 317

[56] References Cited

FOREIGN PATENT DOCUMENTS 238729 7/1964 Austria ................................ 210/488

Primary Examiner—Frank Sever
Attorney, Agent, or Firm—Browdy and Neimark

[57] ABSTRACT

An improved annular filter disc for use in a tubular filter stack of the kind, wherein filtration takes place by causing the liquid to be filtered to pass through the filter stack, wherein the disc is formed with a plurality of angularly spaced apart, springy spacer projections.

4 Claims, 5 Drawing Figures

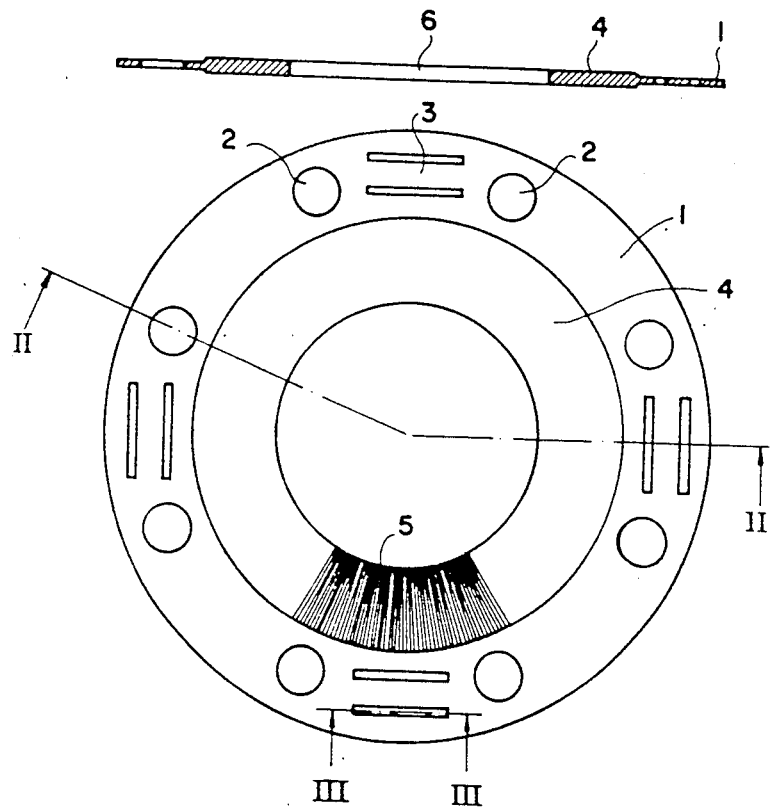
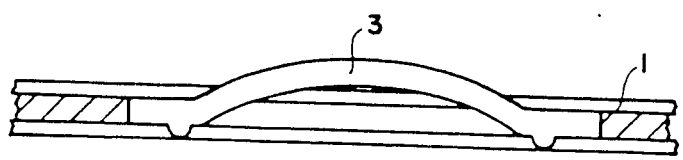
Fig. 2
Fig. 1
Fig. 3

Fig. 4
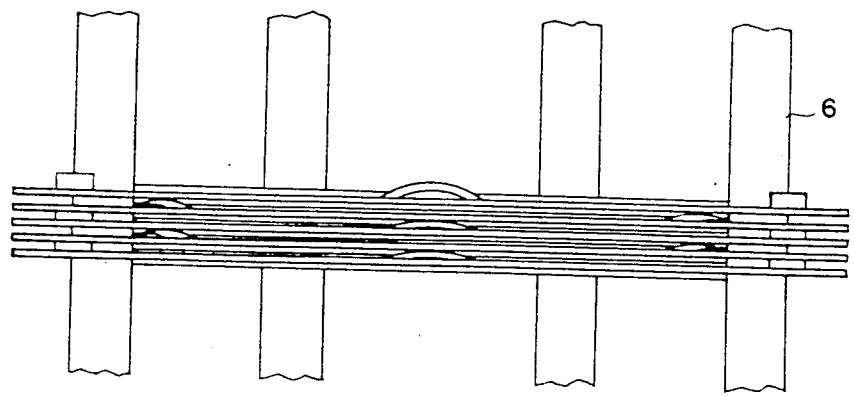
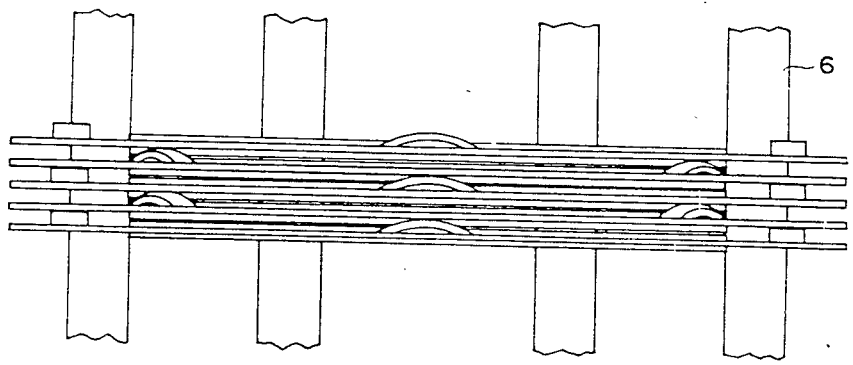
Fig. 5

ANNULAR FILTER DISC

The present invention relates to an improved annular filter disc for use in a tubular filter stack of the kind, hereinafter referred to as a tubular filter stack of the kind specified, wherein filtration takes place by causing the liquid to be filtered to pass through the filter stack, usually from inside the stack to outside the stack and wherein, in order periodically to clear the stack of accumulated contaminants and impurities, some of the filtered liquid is caused to flow in an opposite direction, i.e. from outside the stack to inside the stack from which it is subsequently flushed away together with the accumulated impurities.

Tubular filter stacks of the kind specified are usually constituted by a stack of individual, annular filter discs which are clamped together, during the filtering cycle, so that fine filtering passages are defined between the adjacent juxtaposed discs. When, however, it is desired to subject the stack to a flushing cycle wherein reverse flow of liquid takes place, it is necessary to release the discs from their clamped together position and at the same time to ensure their relative separation so as to ensure a free flushing flow of liquid therethrough which can carry with it all accumulated impurities.

Various means have been proposed and used for ensuring the separation of the discs during the flushing cycle but they have all involved the provision of relatively cumbersome means.

It is an object of the present invention to provide a new and improved annular filter disc for use in a tubular filter stack of the kind specified which facilitates, on the one hand the easy clamping together of the discs to form the stack and, on the other hand the simple and effective separation of the discs during the flushing cycle.

According to the present invention there is provided, for use in a tubular filter stack of the kind specified, an annular filter disc formed with a plurality of angularly spaced apart, springy, spacer projections.

Preferably the projections are formed in an outer annular portion of the disc whilst filter grooves are formed in an inner annular portion thereof.

Such filter discs can be readily clamped together to form a stack by suitable aligning and clamping rods which pass through angularly spaced apart apertures formed in the outer annular portion. It will be readily seen that when such clamping rods are tightened so as to press the discs together, the discs are compressed into a tight stack, the filter grooves being defined between adjacent discs. When, however, it is desired to subject the stack to the flushing cycle, by merely loosening the clamping rods, the discs automatically spring apart as a result of the springiness of the compressed spacer projections and so the spaced apart discs lend themselves to ready flushing.

For a better understanding of the present invention and to show how the same may be carried out in practice, reference will now be made to the accompanying drawings in which:

FIG. 1 is a plan view from above of an annular filter disc in accordance with the present invention, FIG. 2 is a cross-sectional view of the disc shown in FIG. 1 taken along the lines II—II, FIG. 3 is a cross-sectional view, on an enlarged scale of a detail of the disc shown in FIG. 1, FIG. 4 is a schematic side elevation of a portion of a tubular filter stack formed of a plurality of stacked together annular filter discs as shown in FIGS. 1–3 with the discs clamped closely together, and FIG. 5 is a side elevation of the stack shown in FIG. 4 with the discs sprung apart.

As seen in FIGS. 1 through 3 of the drawings, an annular filter disc in accordance with the present invention comprises an outer annular portion 1 in which are formed angularly spaced apart pairs of stacking holes 2, there being formed between the constituent holes of each pair of stacking holes, a springy spacer strip 3 which is formed integrally with the disc at its ends.

An integrally formed inner annular portion 4 which is of slightly greater thickness than the outer annular portion 1 has formed on one or both surfaces thereof radial filtering grooves 5.

The inner annular portion 4 defines a circular aperture 6.

As seen in FIGS. 4 and 5 of the drawings, a stack of discs are stacked together by means of clamping rods 6 which pass through the apertures 2. Means (not shown) are provided for releasably clamping the discs together. In the arrangement as shown in FIG. 4 of the drawings, the clamping of the discs together so that their inner annular portions 4 are pressed together defining between them the filtering passages, carries with it the compression of the raised springy projection strips 3. In this arrangement the stack is ready for the filtering cycle.

When however it is desired to put the stack into the flushing cycle, the clamping means are released, whereupon the discs move apart under the influence of the compressed projection strips 3 and into the position as shown in FIG. 5 of the drawings and in this position flushing liquid can freely pass between the juxtaposed discs carrying away with it entrained impurities or contaminants.

It willl be readily seen therefore that the clamping together of the discs so that they form an effective filtering stack and the subsequent release of the discs so that they move apart allowing for ready flushing is effected by the simplest means and as a consequence of the provision of the discs with the springy spacer projections.

The discs can readily be formed of a suitable plastics material by conventional moulding techniques allowing for the simultaneous formation of the spacer projections.

I claim:

1. A tubular filter stack comprising a stack of annular filter discs; a plurality of angularly spaced apart springy spacer projections formed integrally with a first surface of each disc so as to abut a second and opposite surface of a successive disc for enabling compression of said discs into close juxtaposition one with the other during a filtering cycle and for enabling expansion of said disc one from the other sufficient to enable flushing during a flushing mode; disc mounting means for mounting said discs in a stacked condition and releasable clamping means for clamping said discs together so as to compress said projections.

2. A tubular filter stack according to claim 1 wherein said projections are formed in an outer annular portion of the disc and wherein filter grooves are formed in an inner annular portion of each disc.

3. A tubular filter stack according to claim 2 wherein angularly spaced apart apertures are formed in each said outer annular portion.

4. A tubular filter stack according to claim 1 wherein each projection comprises a raised strip which is formed integrally at its end portions with each disc.

* * * * *